(12) United States Patent
Nakane et al.

(10) Patent No.: US 6,848,620 B2
(45) Date of Patent: Feb. 1, 2005

(54) SEMICONDUCTOR INTEGRATED CIRCUIT

(75) Inventors: George Nakane, Nara (JP); Tatsumi Sumi, Takatsuki (JP)

(73) Assignee: Matsushita Electric Industrial Co., Ltd. (JP)

( * ) Notice: Subject to any disclaimer, the term of this patent is extended or adjusted under 35 U.S.C. 154(b) by 227 days.

(21) Appl. No.: 10/119,123

(22) Filed: Apr. 10, 2002

(65) Prior Publication Data

US 2002/0153997 A1 Oct. 24, 2002

(30) Foreign Application Priority Data

Apr. 19, 2001 (JP) ........................................ 2001-120424

(51) Int. Cl.⁷ .............................................. G06K 19/06
(52) U.S. Cl. ...................................................... 235/492
(58) Field of Search .............................. 235/487, 492; 375/219

(56) References Cited

U.S. PATENT DOCUMENTS

| | | | | |
|---|---|---|---|---|
| 5,349,173 A | | 9/1994 | Scheckel et al. ............. | 235/492 |
| 5,862,174 A | * | 1/1999 | Yokota et al. ............... | 375/219 |
| 5,889,273 A | * | 3/1999 | Goto ........................... | 235/492 |
| 6,070,804 A | * | 6/2000 | Miyamoto .................... | 235/494 |

FOREIGN PATENT DOCUMENTS

| | | |
|---|---|---|
| EP | 0 897 162 A2 | 2/1999 |
| FR | 2 751 148 | 1/1998 |
| JP | 10240889 A | 9/1998 |
| JP | 10322250 A | 12/1998 |
| JP | 11066248 A | 3/1999 |
| JP | 11215026 A | 8/1999 |
| JP | 2001125653 A | 5/2001 |
| JP | 202236890 A | 8/2002 |
| WO | 98/02840 | 1/1998 |
| WO | WO 99/57881 | 11/1999 |

\* cited by examiner

*Primary Examiner*—Michael G. Lee
*Assistant Examiner*—Jamara A. Franklin
(74) *Attorney, Agent, or Firm*—Parkhurst & Wendel, L.L.P.

(57) ABSTRACT

A semiconductor integrated circuit is provided to allow a stable operation even in a short distance where an IC card is in contact with a reader/writer. In a semiconductor integrated circuit for a noncontact IC card that obtains driving power supply by carrying superimposed data, obtained voltage does not become overvoltage and data can be demodulated with stability regardless of a change in communication distance. Inputs of a system (including a rectifier circuit and a power supply circuit) producing power supply from an antenna coil of the IC card which receives radio waves transmitted from a reader/writer, and of a demodulator circuit are connected via a path separated from the output of the rectifier circuit. Thus, a power supply voltage range can be set within a permissible value and a rate of change in input of the demodulator circuit can be obtained regardless whether the communication distance is short or long.

4 Claims, 10 Drawing Sheets

SEMICONDUCTOR INTEGRATED CIRCUIT

FIELD OF THE INVENTION

The present invention relates to a semiconductor integrated circuit and a noncontact information medium having the semiconductor integrated circuit.

BACKGROUND OF THE INVENTION

In recent years, a noncontact information medium such as an IC card has been put into practical use. Such a medium can supply power via radio waves by using a mutual induction phenomenon of coils and can transmit and receive data.

An IC card as an example of a noncontact information medium is broadly categorized into a close proximity type, a proximity type, a vicinity type, and so on based on communication distances between the IC card and a reader/writer, which transmits and receives radio waves to and from the IC card. Standardization has been prepared for each of the types.

Particularly a proximity-type IC card, which can be used at a distance of about 0 to 10 cm from a reader/writer, may have quite extensive application. For example, when the IC card is used for a commutation ticket and the like, without taking out the IC card from a commutation-ticket holder at a ticket gate of a station, the opening and closing of the ticket gate can be controlled according to exchange of information with a reader/writer in a noncontact state.

However, smaller and lighter IC cards are important for the more extensive application. The more extensive the application of IC cards is, the less care will be taken for the handling of them. Thus, in view of resistance to a breakdown from rough handling, a semiconductor integrated circuit having a complicated circuit in a small area has been normally mounted in a noncontact information medium such as an IC card.

Referring to FIGS. 7 to 10, the following will discuss the technique of a conventional noncontact IC card with a semiconductor integrated circuit embedded in it.

FIG. 7 shows the conventional noncontact IC card and reader/writer.

A noncontact IC card 60 is constituted by a noncontact IC card integrated circuit 61 (hereinafter, "integrated circuit" will be referred to as "LSI"), an antenna coil 62, and a tuning capacitor 63. The LSI 61 is constituted by an analog circuit 70, a logic circuit 71, a memory circuit 72, and so on.

To pads 90 and 91 of the LSI 61, the antenna coil 62 is connected for transmitting and receiving radio waves 66 to and from an antenna coil 65, which is connected to a reader/writer 64. The tuning capacitor 63 is connected to the antenna coil 62. The antenna coil 62 receives radio waves from the reader/writer 64, and alternating voltage is produced across the antenna coil 62 (between the pad 90 and the pad 91). The alternating voltage produced across the antenna coil 62 is applied to the analog circuit 70.

The analog circuit 70 is constituted by a rectifier circuit 80, a power supply circuit 81, a clock generating circuit 82, a demodulator circuit 83, a modulator circuit 84, and so on. In the analog circuit 70, power supply voltage L for operating the logic circuit 71 and power supply voltage H for operating the memory circuit 72 are produced by the rectifier circuit 80 and the power supply circuit 81.

The clock generating circuit 82 generates a clock by using alternating voltage, which is produced across the antenna coil 62, as an input signal. The above clock CLK operates the digital circuit 71 and the memory circuit 72.

Data transmitted and received between the noncontact IC card 60 and the reader/writer 64 is transmitted and received while being superimposed on radio waves (the above alternating voltage). When the noncontact IC card 60 receives data from the reader/writer 64, the IC card performs demodulation in the demodulator circuit 83 to obtain a demodulation signal (RXDATA). When the noncontact IC card 60 transmits data to the reader/writer 64, a transmitted signal (TXDATA) is modulated in the modulator circuit 84.

In this manner, data transmitted and received between the IC card and the reader/writer 64 is interpreted in the logic circuit 71, the data is stored in the memory circuit 72 after addresses and data are specified, and the data is read after an address is specified.

Here, referring to FIGS. 8 and 9, the following will discuss the rectifier circuit 80, the power supply circuit 81, and the demodulator circuit 83 in the analog circuit 70.

As shown in FIG. 8, alternating voltage produced across the antenna coil 62 is directly inputted to the rectifier circuit 80 via the pads 90 and 91. The rectifier circuit 80 acts as a voltage doubler rectifier circuit composed of diodes 100 and 101.

The power supply circuit 81 is constituted by a shunt circuit 110 and smoothing capacitors 111 and 112, and power supply voltage H is clamped to a predetermined voltage by the shunt circuit 110.

The operating principle of the rectifier circuit 80 is shown in FIG. 9.

FIG. 9(A) shows alternating voltage 120 (voltage relative to the pad 90: voltage 121) produced across the antenna coil 62 when data is transmitted from the reader/writer 64. The data has been subjected to ASK modulation at a carrier frequency of 13.56 MHz, which is used for communication of the noncontact IC card.

The following will discuss the case in which the reader/writer 64 transmits data by encoding NRZ. The data is obtained by performing ASK modulation on digital data. Namely, when the reader/writer 64 transmits "H" data, the alternating voltage 120 across the antenna coil is set at a high level. When the reader/writer 64 transmits "L" data, the alternating voltage 120 across the antenna coil is set at a low level.

First, the following will discuss how power supply voltage is produced by the alternating voltage 120 produced across the antenna coil 62. Here, it is easier to understand when a terminal voltage of the pad 90 is set at a reference voltage 121.

Negative component voltage (VSS) 122 is produced by the diode 100 of the rectifier circuit 80. The power supply voltage L is smoothed by the smoothing capacitor 111. Further, power supply voltage H (level 123 of FIG. 9) is produced from positive component voltage by the diode 101 of the rectifier circuit 80, and the power supply voltage H is smoothed by the smoothing capacitor 112.

In the IC card, since a distance from the reader/writer 64 is changed, the alternating voltage 120 produced across the antenna coil 62 (between the pad 90 and the pad 91) is changed even when the radio waves 66 transmitted from the reader/writer 64 are constant.

Namely, when the reader/writer 64 and the IC card are in contact with each other, the alternating voltage 120 increases in level. Further, when the reader/writer 64 is away from the IC card, the alternating voltage 120 decreases in level.

In the case of ISO14443 (proximity-type noncontact IC card: standard of a communication distance of about 10 cm), which is an international standard of noncontact IC cards, depending upon the shapes of the antenna coil 66 in the reader/writer 64 and the antenna coil in the IC card, the intensity of the radio waves 66 received by the IC card is changed by five to ten times in a close state as compared with a distance of 10 cm. Assuming that the power consumption of the LSI 61 is constant regardless of voltage, power supply voltage is changed by five to ten times.

Namely, in the case of a distance of 10 cm between the IC card and the reader/writer 64, when the power supply voltage H is about 4V, by shortening the distance between the IC card and the reader/writer 64 close to 0 cm, the power supply voltage H rises to 20 V or more so as to damage the built-in LSI 61.

Thus, power supply voltage is clamped by the shunt circuit 110 to increase consumed current of the LSI 61 in appearance.

FIG. 10 shows the voltage and current characteristics of the shunt circuit 110.

When a final-stage transistor for determining current and voltage characteristics is composed of a MOS transistor, the shunt circuit 110 conducts current at a voltage more than a predetermined threshold voltage according to a square function of voltage. Further, when the final-stage transistor is composed of a bipolar transistor, the shunt circuit 110 conducts current at a voltage more than a predetermined threshold voltage according to an exponential function. In the case of FIG. 10, the shunt circuit 110 hardly consumes current when the power supply voltage H is 4V, and the shunt circuit 110 consumes current of 10 mA when the power supply voltage H is 5V.

Namely, in a state in which large current is applied to the shunt circuit 110, a change in power supply voltage is smaller even when current is changed.

FIG. 9(B) shows the state of power supply voltage at a long distance that communication is possible.

When the reader/writer 64 transmits "H" data, the power supply voltage H is set at a high level (about 5V), and when the reader/writer 64 transmits "L" data, the power supply voltage H is set at a low level (about 4V).

FIG. 9(C) shows the state of the power supply voltage at a short distance that communication is possible.

When the reader/writer 64 transmits "H" data, the power supply voltage H is set at a high level (about 5.5V), and when the reader/writer 64 transmits "L" data, the power supply voltage H is set at a low level (about 5.3V).

Namely, the shunt circuit 110 supplies large power supply current when the power supply voltage H is increased (FIG. 10). Thus, when the power supply voltage H is increased, the shunt circuit 110 has greater capability of conducting current, resulting in smaller change in power supply voltage. Therefore, a change in power supply voltage H is reduced.

In the conventional analog circuit 70, the demodulator circuit 83 receives power supply voltage and detects a rate of change in power supply voltage. Thus, a change in power supply is reduced at a short distance that communication is possible, so that it becomes difficult to produce a demodulating signal (RXDATA).

DISCLOSURE OF THE INVENTION

Noncontact IC cards are broadly categorized into a close proximity type with a communication distance of 0 to 2 mm, a proximity type with a communication distance of 0 to 10 cm, a vicinity type with a communication distance of 0 to 70 cm, and a microwave with a communication distance of 0 to 10 m. Technical difficulty arises for a longer communication distance. The close proximity type (communication distance of 0 to 2 mm) is not so different from a contact IC card in characteristics, which is now widely used. Thus, the merit of the noncontact IC card is not sufficiently exerted. Therefore, after contact IC cards, proximity-type noncontact IC cards (communication distance of 0 to 10 cm) are expected to become widespread.

Here, the requirement of a semiconductor integrated circuit for a noncontact IC card is to produce voltage for operating an internal digital circuit and a nonvolatile memory with stability to obtain a demodulation signal even at a distance from 0 to 10 cm from a reader/writer.

However, at a short distance of 0 cm that an IC card is close to a reader/writer 64, in conventional circuits, unless power supply voltage H and power supply voltage L to a logic circuit 71 and a memory circuit 72 are supplied within specifications (5.5V or less in the case of an LSI of a 5V-system LSI), that is, unless a shunt circuit 110 has higher capability of consuming current, the semiconductor integrated circuit cannot be guaranteed.

However, when the shunt circuit 110 has higher capability of consuming current, demodulation becomes difficult in a demodulator circuit 83, which performs demodulation according to differential waveforms of power supply voltage (a rate of change in power supply voltage H is detected), because of a smaller change in power supply.

Conversely, when the shunt circuit 110 has lower capability, although demodulation can be performed, voltage of an analog circuit 70 is increased and is hard to be below specifications (5.5V or less in the case of the 5V-system LSI).

An object of the present invention is to provide a semiconductor integrated circuit by which a stable operation is expected at a short distance that the IC card is in contact with the reader/writer.

A semiconductor integrated circuit of the present invention, which comprises a demodulator circuit for demodulating an inputted received signal to reproduce data, a rectifier circuit for rectifying the received signal to produce power supply voltage, and a regulator which is connected to the output side of the rectifier circuit and prevents the power supply voltage from exceeding a predetermined voltage value, is characterized in that the input of the rectifier circuit and the input of the demodulator circuit are connected via a path separated from the output of the rectifier circuit.

According to the above-mentioned configuration, since a signal path for producing power supply from an antenna coil and a signal path to the demodulator circuit are separately provided, a rate of change in input of the demodulator circuit can be obtained regardless of a short or long communication distance. It is possible to obtain an IC card with stability by using such a semiconductor integrated circuit for a noncontact information medium.

A semiconductor integrated circuit of the present invention comprises a demodulator circuit for demodulating an inputted received signal to reproduce data, a rectifier circuit for rectifying the received signal to produce power supply voltage, and a regulator which is connected to the output side of the rectifier circuit and prevents the power supply voltage from exceeding a predetermined voltage value, the circuit being characterized in that the input of the rectifier circuit and the input of the demodulator circuit are connected via a path separated from the output of the rectifier circuit.

According to an embodiment of the present invention, the input of the rectifier circuit and the input of the demodulator circuit are connected via resistors.

Moreover, the resistors are each composed of a resistor formed by a wire made of a material including polysilicon.

Besides, envelope detector circuits are provided on the input side of the demodulator circuit.

Also, the above-mentioned rectifier circuit is composed of voltage doubler rectifier circuits for outputting direct current power of two systems in parallel with different voltages, and a reference potential of the envelope detector circuits is connected to the low-voltage output side of the voltage doubler rectifier circuit.

A noncontact information medium of the present invention, which receives a carrier wave modulated by digital data, rectifies the received carrier wave to provide necessary electric power, demodulates the received carrier wave to perform writing or reading based on the digital data to a memory circuit, and modulates a carrier wave based on read data and outputs the carrier wave when reading is performed, is characterized by comprising the above-mentioned semiconductor integrated circuit.

DESCRIPTION OF THE EMBODIMENTS

Referring to FIGS. 1 to 6, embodiments of the present invention will be discussed below.

(Embodiment 1)

Figure 1:
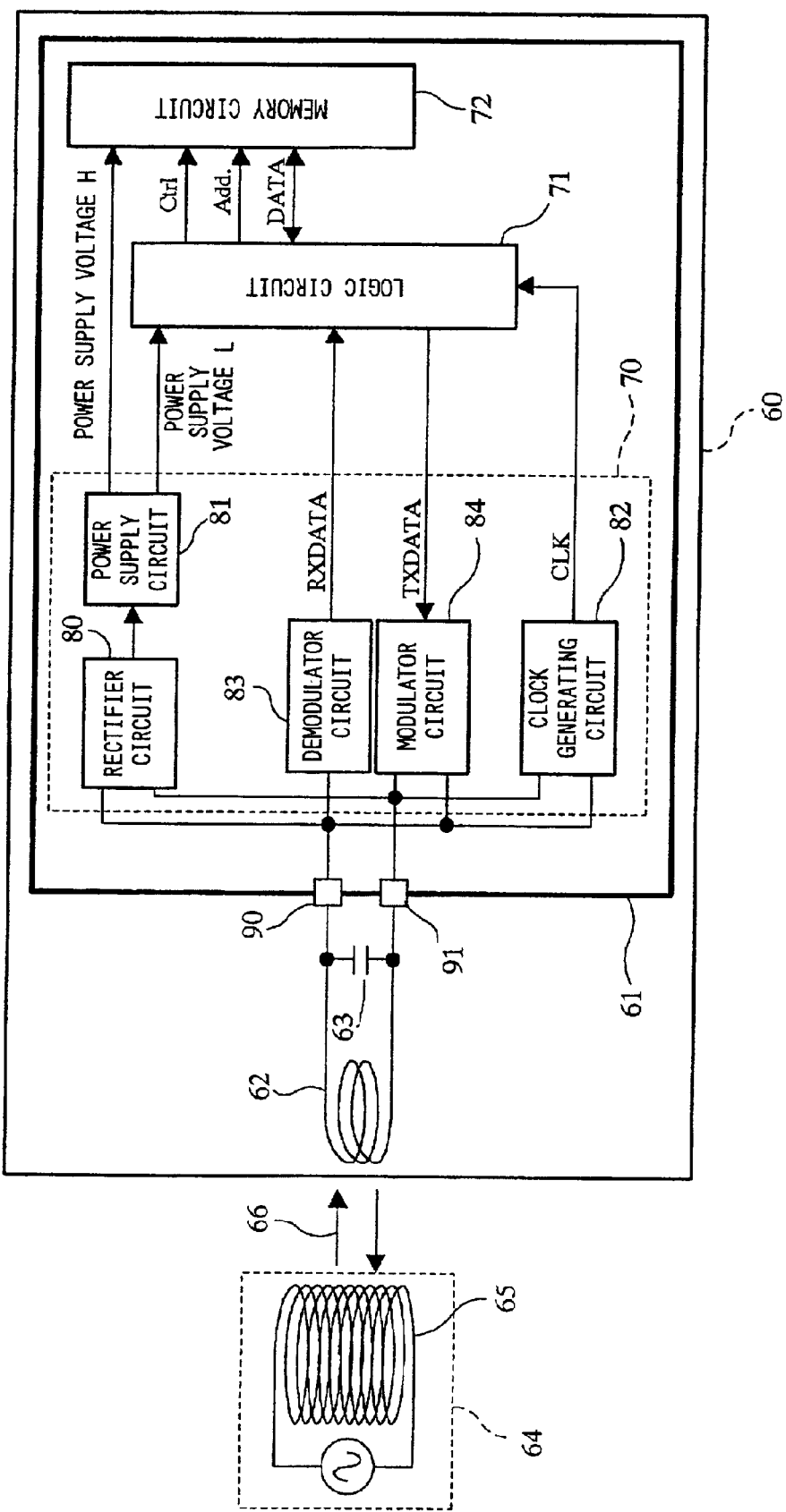
FIG. 1 is a block diagram showing a noncontact information medium having a semiconductor integrated circuit according to (Embodiment 1) of the present invention.
Figure 2:
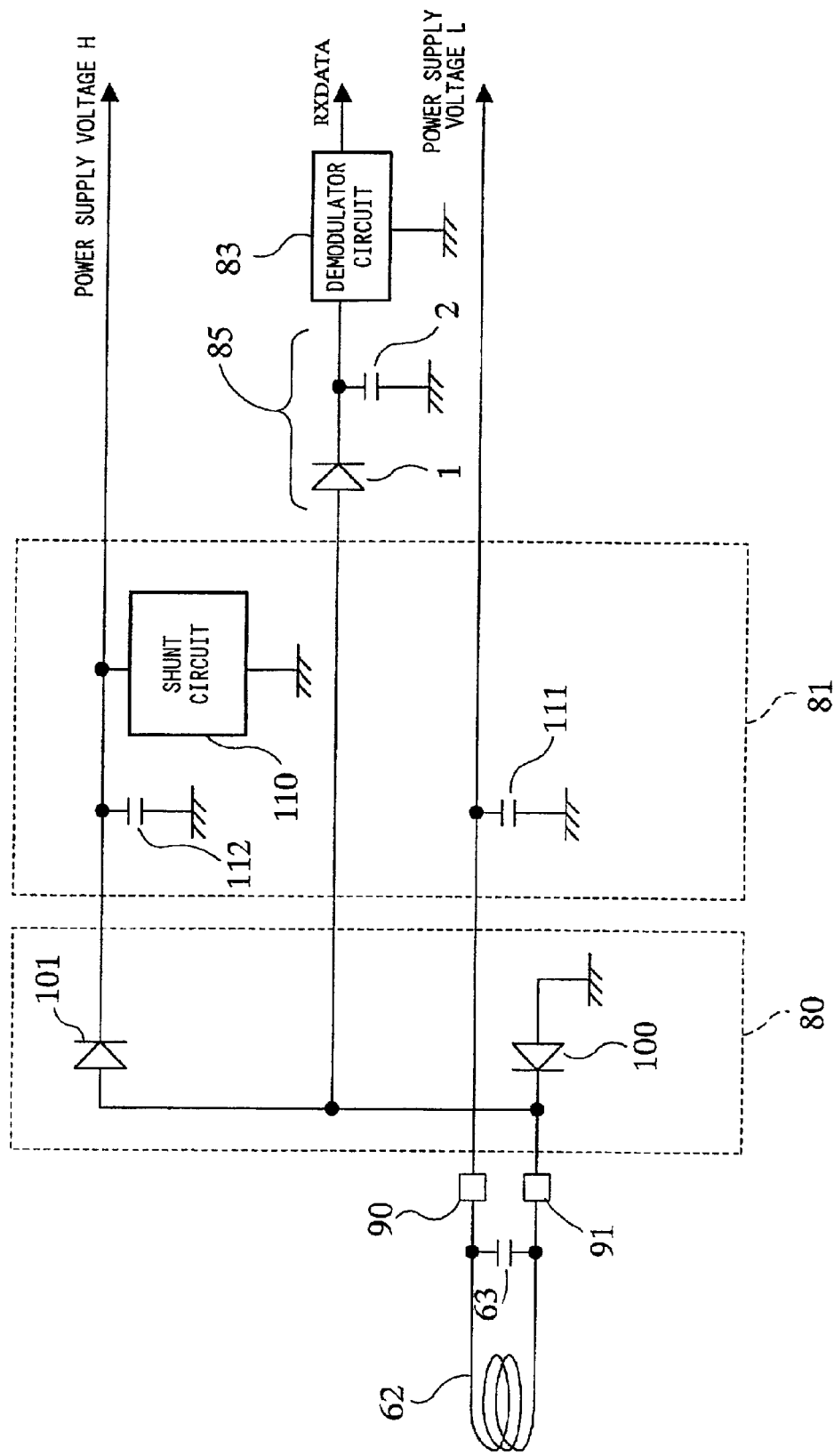
FIG. 2 is a structural diagram showing a voltage generating circuit and a demodulator circuit of the (Embodiment 1)

FIGS. 1 and 2 show a noncontact IC card 60 serving as a noncontact information medium of (Embodiment 1) of the present invention. Besides, the same configuration as FIG. 7 of the conventional art is indicated by the same reference numeral for explanation.

Figure 7:
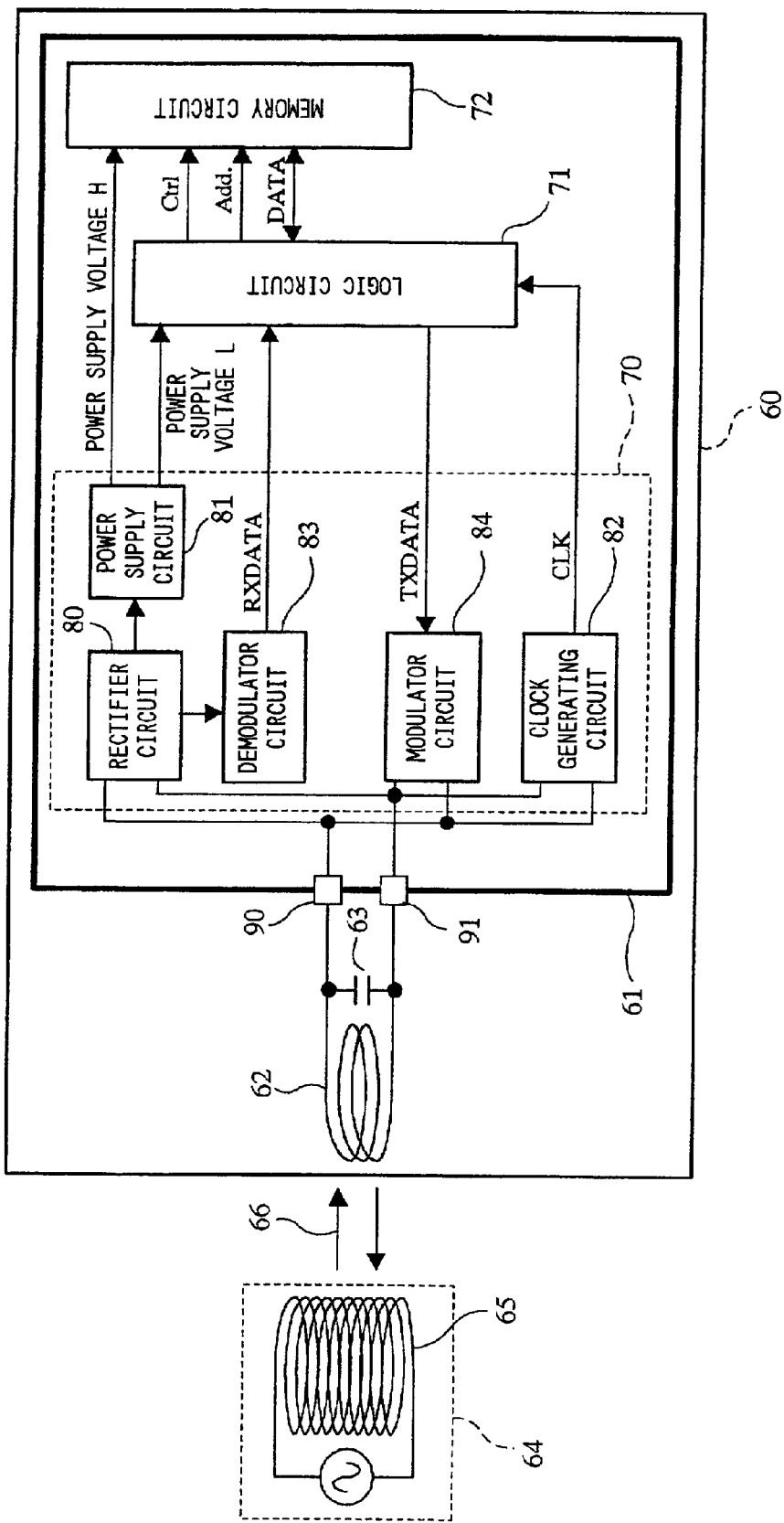
FIG. 7 is a block diagram showing a conventional noncontact IC card and reader/writer.
Figure 8:
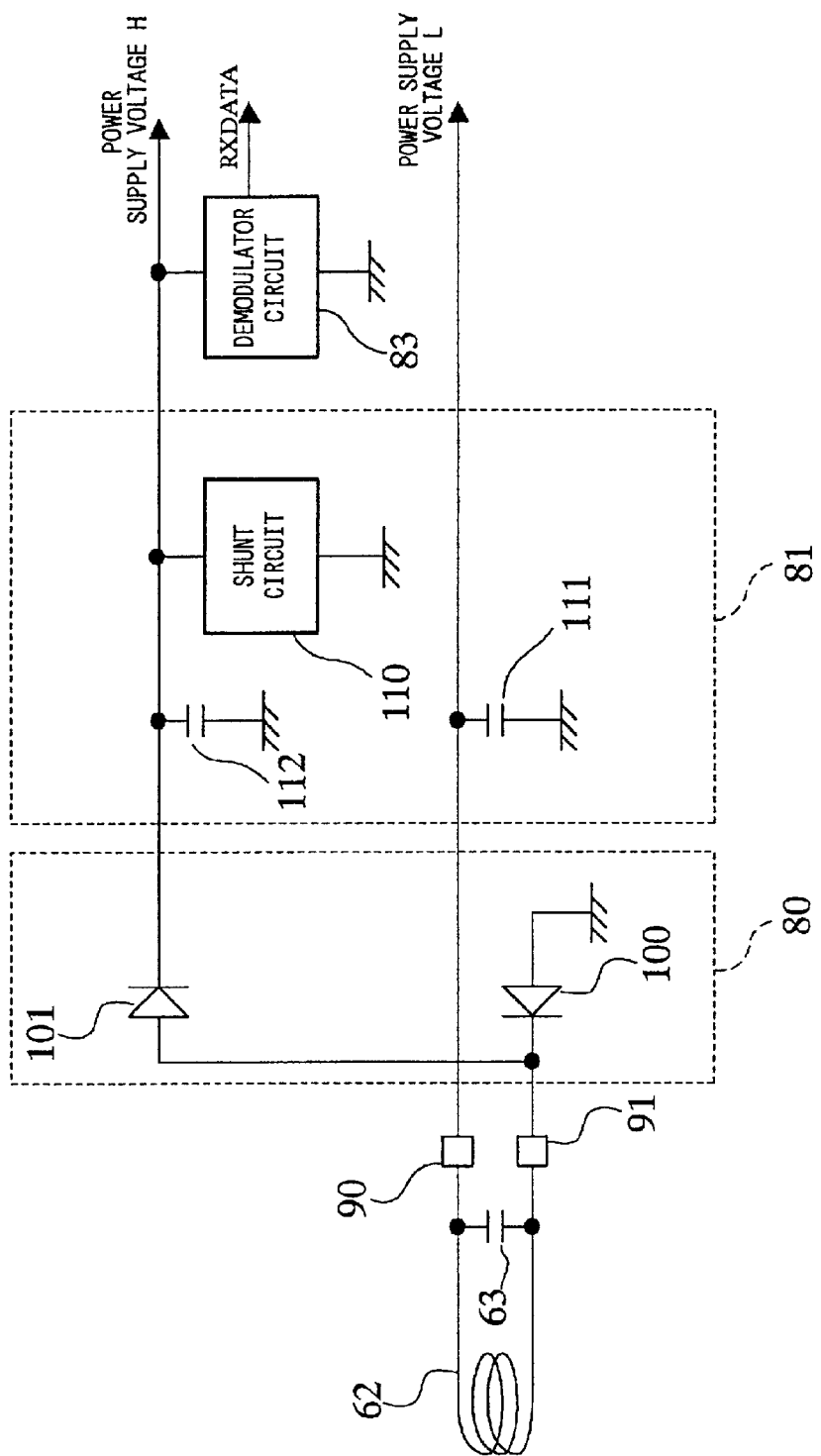
FIG. 8 is a structural diagram showing a voltage generating circuit and a demodulator circuit of the conventional art.
Figure 9:
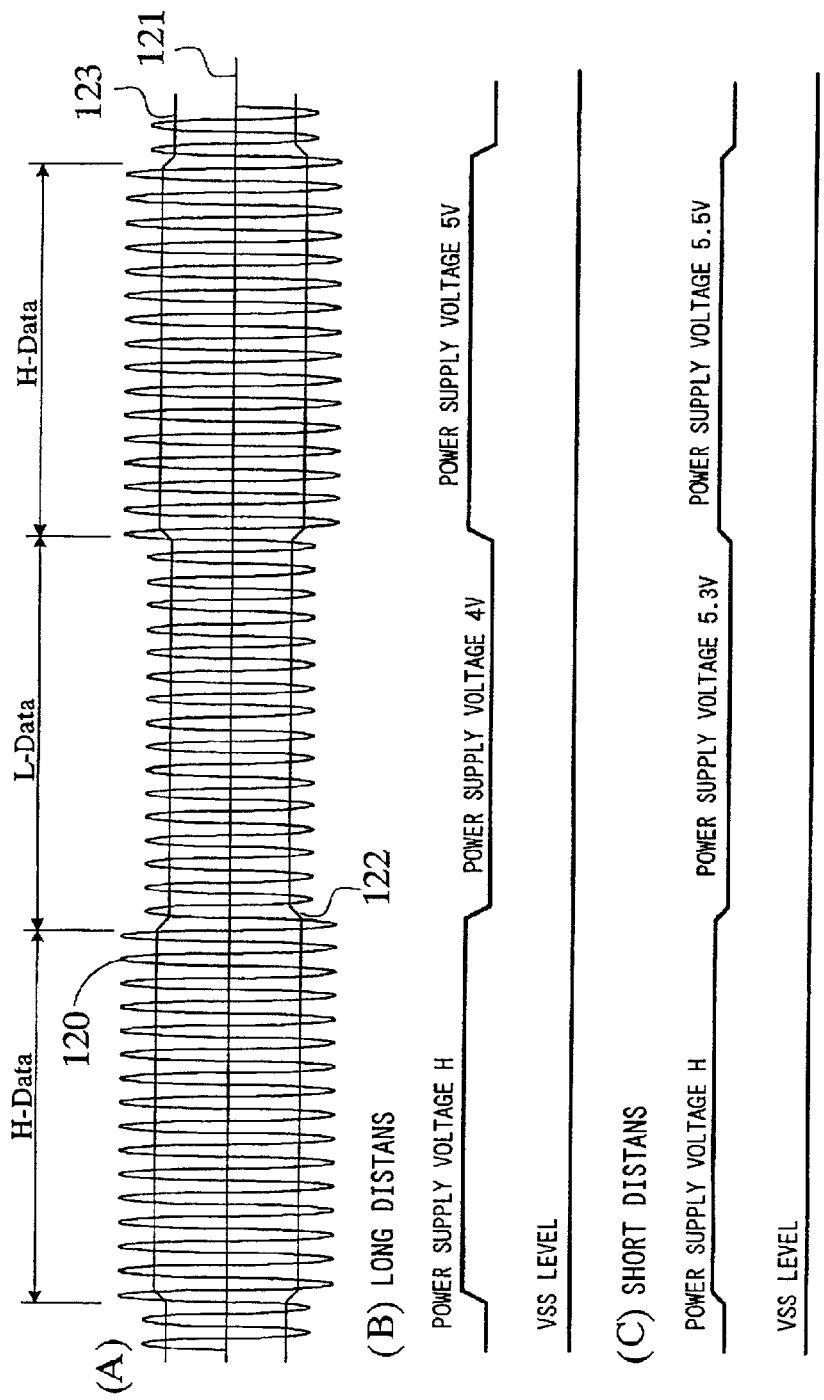
FIG. 9 is an input/output waveform chart for explaining operating principle of generating power supply voltage according to the conventional art.
Figure 10:
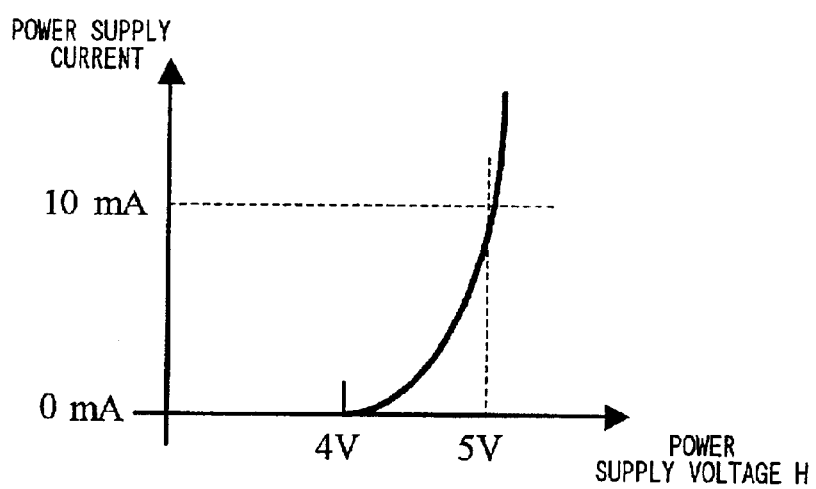
FIG. 10 is a characteristic diagram showing a shunt circuit of the conventional art.

In FIG. 7 of the conventional art, the input of the demodulator circuit 83 is connected to the output of the rectifier circuit 80. In (Embodiment 1), the input of a rectifier circuit 80 and the input of a demodulator circuit 83 are connected in parallel.

To be specific, as shown in FIG. 2, a connecting point between the anode of a diode 100 and the cathode of a diode 101 is connected to a pad 91 of an LSI 61, the anode serving as the input of the rectifier circuit 80, and the input of the demodulator circuit 83 is further connected to the connecting point.

The input of the demodulator circuit 83 is connected to the pad 91, which is connected to the input of the rectifier circuit 80, via an envelope detector circuit 85 composed of a diode 1 and a smoothing capacitor 2 that are used only for the demodulator circuit 83.

An envelope signal of a transmitted radio wave from a reader/writer 64 is taken out in the smoothing capacitor 2 via the diode 1 and is directly inputted to the demodulator circuit 83.

With the above configuration, in order to operate an IC card 60 with stability at a short distance, the upper limit of power supply voltage H is suppressed by a shunt circuit 110, which serves as a regulator, such that the power supply voltage is not increased. It is possible to set a range of power supply voltage at a permissible value or less by setting current capability of the rectifying diode 101 low. Further, a signal input can be supplied to the demodulator circuit 83 without reducing a rate of change in input voltage of the demodulator circuit 83. Namely, the IC card can operate with stability from a short distance to a long distance.

Here, (Embodiment 1) discussed a voltage doubler rectifier circuit. (Embodiment 1) is also effective for a full-wave rectifier circuit and a half-wave rectifier circuit.

(Embodiment 2)

Figure 3:
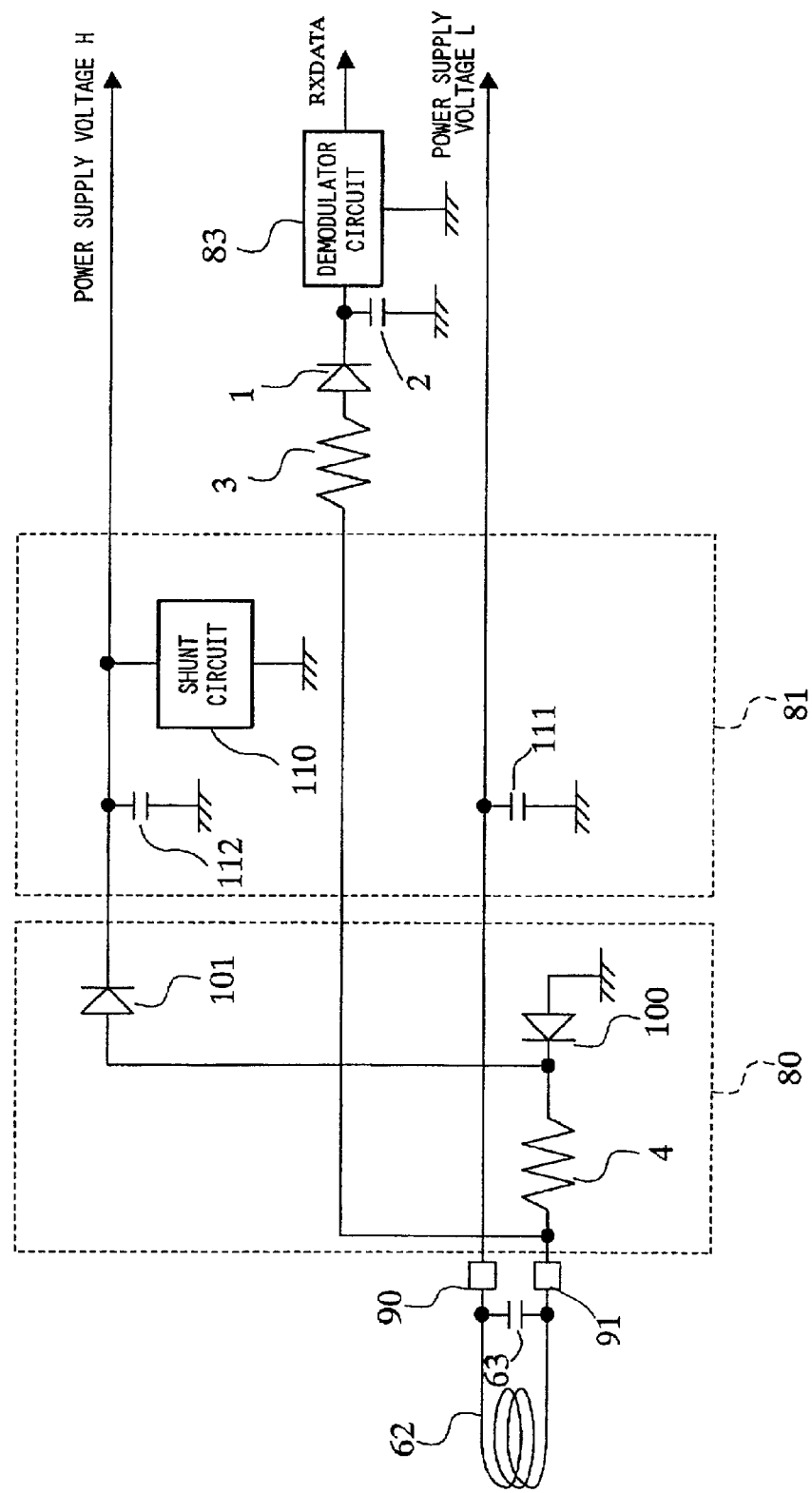
FIG. 3 is a structural diagram showing a voltage generating circuit and a demodulator circuit of (Embodiment 2) of the present invention.

FIG. 3 shows (Embodiment 2) of the present invention that is another specific example of FIG. 2.

When the noncontact IC card 60 of (Embodiment 1) of the present invention and a noncontact IC card 60 of (Embodiment 2) of the present invention are compared with each other, (Embodiment 2) is different in that input is made to a diode 1 from a pad 91 of an LSI 61 via a resistor 3.

Further, a resistor 4 is provided between the pad 91 and the cathode of a diode 100.

In (Embodiment 1), when the IC card is operated at a short distance, the upper limit of power supply voltage H is suppressed by a shunt circuit 110 such that power supply voltage is not increased, with a diode 101 for rectification having a low current capability. Power supply voltage (5.5V or less) and voltage drop (about 2 to 5V, larger than a threshold voltage of about 0.7V of a typical diode) of the diode are applied to the diode.

Namely, overvoltage is applied to the diodes 100 and 101 of the rectifier circuit 80. In the semiconductor, the diode is formed by PN junction or a MOS transistor. Thus, when overvoltage is applied, breakdown occurs at a junction, resulting in malfunction of an internal circuit and damage on a semiconductor device.

Thus, in (Embodiment 2), an antenna coil 62 is not directly connected to the diode and the like in the rectifier circuit 80 but is connected via a resistor 4 and a resistor 3.

For the resistors 3 and 4, polysilicon wires are used, which form a gate electrode when the semiconductor is manufactured. Thus, the resistors 3 and 4 can be formed without increasing manufacturing cost.

When the IC card is operated at a short distance, the upper limit of power supply voltage H is suppressed by a shunt circuit 110 such that power supply voltage is not increased. Since the shunt circuit 110 consumes much power supply current, current applied to the resistor 4 is larger and voltage drop is increased in the resistor 4.

Since power supply current of about 10 mA is applied, when a resistance of the resistor 4 is set at 500 Ω, voltage drop of 5V occurs.

Voltages applied to the diodes 100 and 101 in the rectifier circuit 80 can be reduced by 5V by inserting the resistors, so that application of overvoltage can be prevented.

Further, overvoltage can be prevented by inserting the resistor 3 into an input section of the demodulator-circuit 83. And then, even when much power supply current is applied due to characteristics of the shunt circuit 110, the voltage drop is caused across the resistor 4. Thus, an envelope has a large change in voltage inputted to the demodulator circuit 83 and the demodulator circuit can be operated with stability.

When the IC card is operated at a long distance, the shunt circuit 110 hardly applies current and only a logic circuit 71 and a memory circuit 72 consume current (about 0.5 mA). Hence, when a resistance of the resistor 4 is set at 500 Ω, only voltage drop of about 0.3V occurs, which makes the circuit operation equal to that of the circuit without the resistors inserted.

(Embodiment 3)

Figure 4:
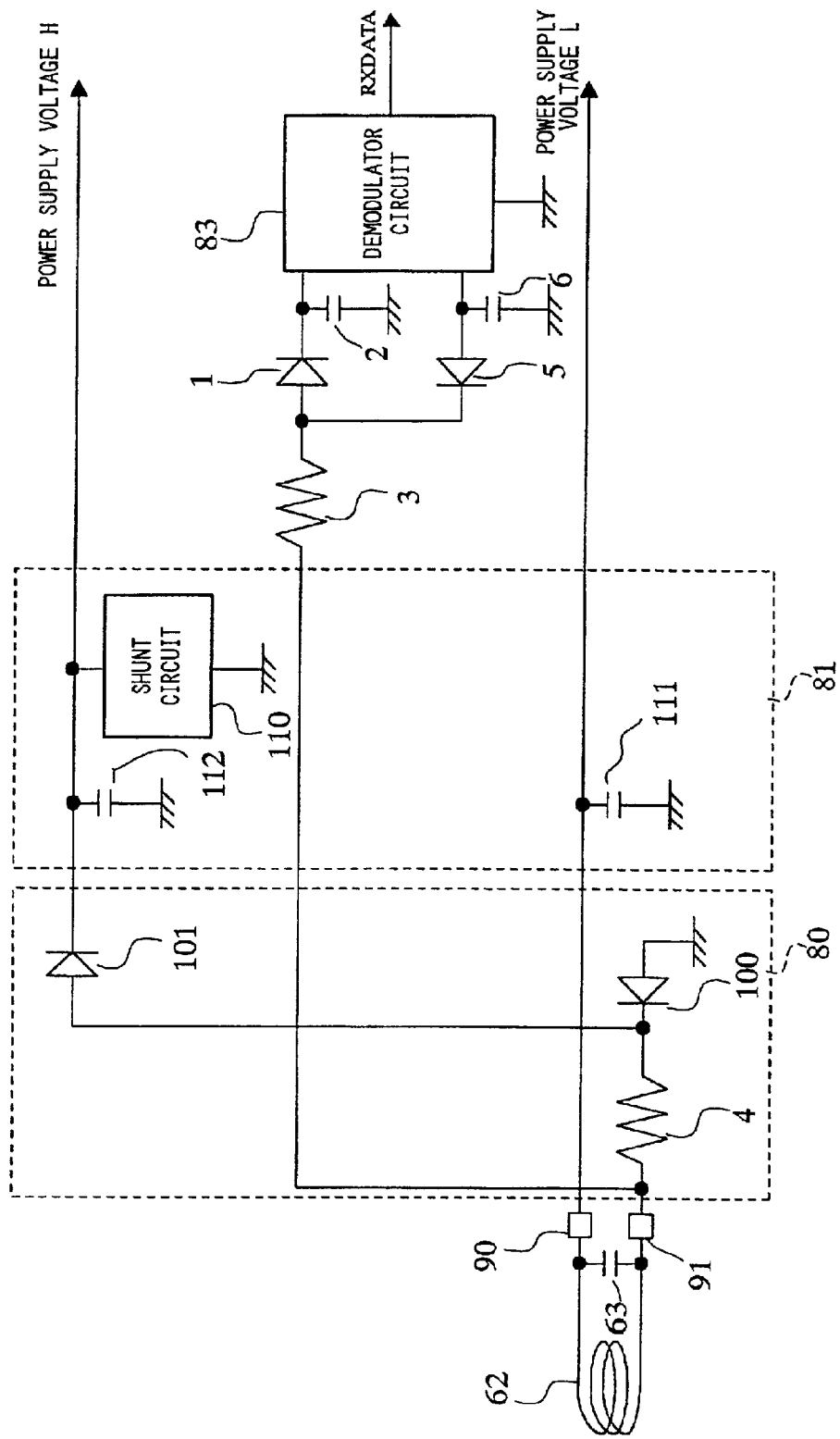
FIG. 4 is a structural diagram showing a voltage generating circuit and a demodulator circuit of (Embodiment 3) of the present invention.
Figure 5:
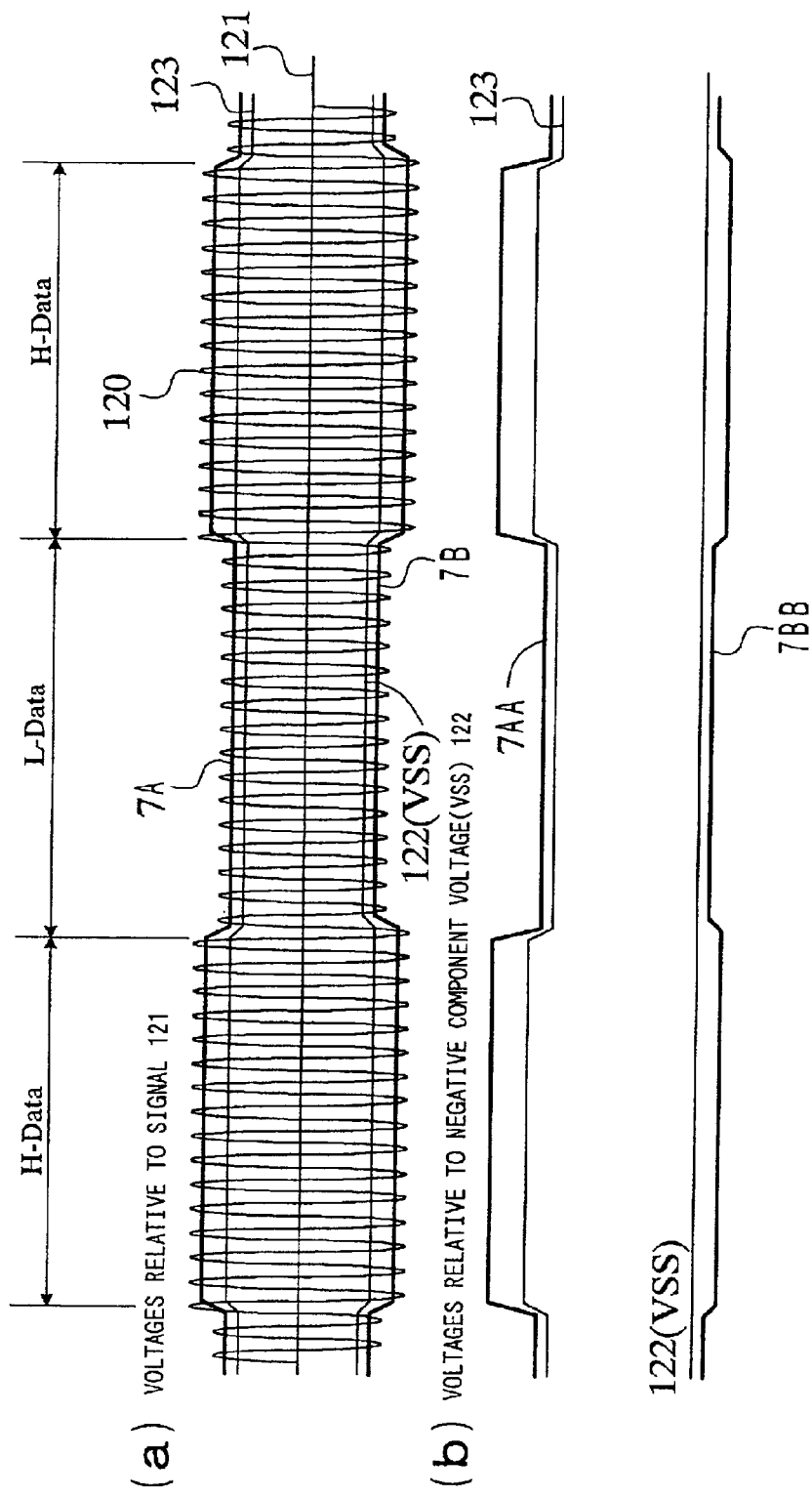
FIG. 5 is an input waveform chart to the demodulator circuit of the (Embodiment 3)

FIGS. 4 and 5 show (Embodiment 3) of the present invention that is another specific example of FIG. 3.

When the semiconductor integrated circuit of the noncontact IC card according to (Embodiment 2) of the present invention is compared with a semiconductor integrated circuit of a noncontact IC card according to (Embodiment 3) of the present invention, (Embodiment 3) comprises a diode 5, which is disposed in a direction opposite to the input of a demodulator circuit 83, and a smoothing capacitor 6.

The operation of a demodulator circuit 83 will be discussed. Radio waves transmitted from a reader/writer 64 are received by an antenna coil 62 of an LSI 61. Voltage obtained by performing envelope detection on alternating voltage 120 is inputted to the demodulator circuit 83. The alternating voltage 120 is produced across the antenna coil. The demodulator circuit 83 demodulates the voltage to produce demodulated data (RXDATA).

FIG. 5(A) shows the alternating voltage 120 (voltage level 121 relative to a pad 90) produced across the antenna coil when data undergoing ASK modulation at a carrier frequency of 13.56 MHz is transmitted from the reader/writer 64. The carrier frequency is frequently used for communication of a noncontact IC card. The following case is considered: digital data is subjected to ASK modulation and the data is transmitted by encoding NRZ from the reader/writer 64. Namely, when the reader/writer 64 transmits "H" data, the alternating voltage 120 across the antenna coil is set at a high level. When the reader/writer 64 transmits "L" data, the alternating voltage 120 across the antenna coil is set at a low level.

The case is considered where power supply voltage is produced. Here, the reader/writer 64 and the LSI 61 are disposed at a short distance where a demodulation signal level is hard to obtain.

Negative component voltage (VSS) 122 is produced by a diode 100 of a rectifier circuit 80. Power supply voltage L is smoothed by a smoothing capacitor 111. Further, a diode 101 of the rectifier circuit 80 allows positive component voltage to produce power supply voltage H (level 123), and the power supply voltage H is smoothed by a smoothing capacitor 112.

When the reader/writer 64 and the LSI 61 are disposed at a short distance, a shunt circuit 110 for clamping is provided to suppress an excessive increase in power supply voltage. Therefore, a change in power supply voltage is small and demodulation becomes difficult.

Thus, as described in (Embodiment 2), a resistor 4 is inserted and the influence of the shunt circuit 110 on suppressing power supply voltage is reduced so as to increase a rate of change in input to the demodulator circuit 83.

As shown in FIG. 5(A), voltage inputted to the demodulator circuit 83 is increased by inserting the resistor 4. Namely, regarding the input of a conventional demodulator circuit, only a change in power supply voltage H is inputted. A signal on the high-voltage side is used as a signal 7A and a signal on the low-voltage side is used as a signal 7B by inserting the resistor.

Regarding the input to the demodulator circuit 83 in (Embodiment 2) of the present invention, only the signal 7A on the high-voltage side is inputted. In order to stabilize the operation of the demodulator circuit 83 when the reader/writer 64 and the LSI 61 are disposed at a shorter distance, in (Embodiment 3), diodes 1 and 5 with polarities in opposite directions and voltage smoothing capacitors 2 and 6 are provided in combination on the input of the demodulator circuit 83.

FIG. 5(B) shows signal voltages relative to the negative component voltage (VSS) 122. A signal 7AA and a signal 7BB are signals relative to negative component voltage (VSS) 122.

In (Embodiment 2) of the present invention, a change in voltage of 7AA is used as an input signal level of the demodulator circuit. With the circuit configuration of (Embodiment 3) of the present invention, changes in both signals of 7AA and 7BB can be used as input signal levels of the demodulator circuit, thereby increasing an input signal change component.

(Embodiment 4)

Figure 6:
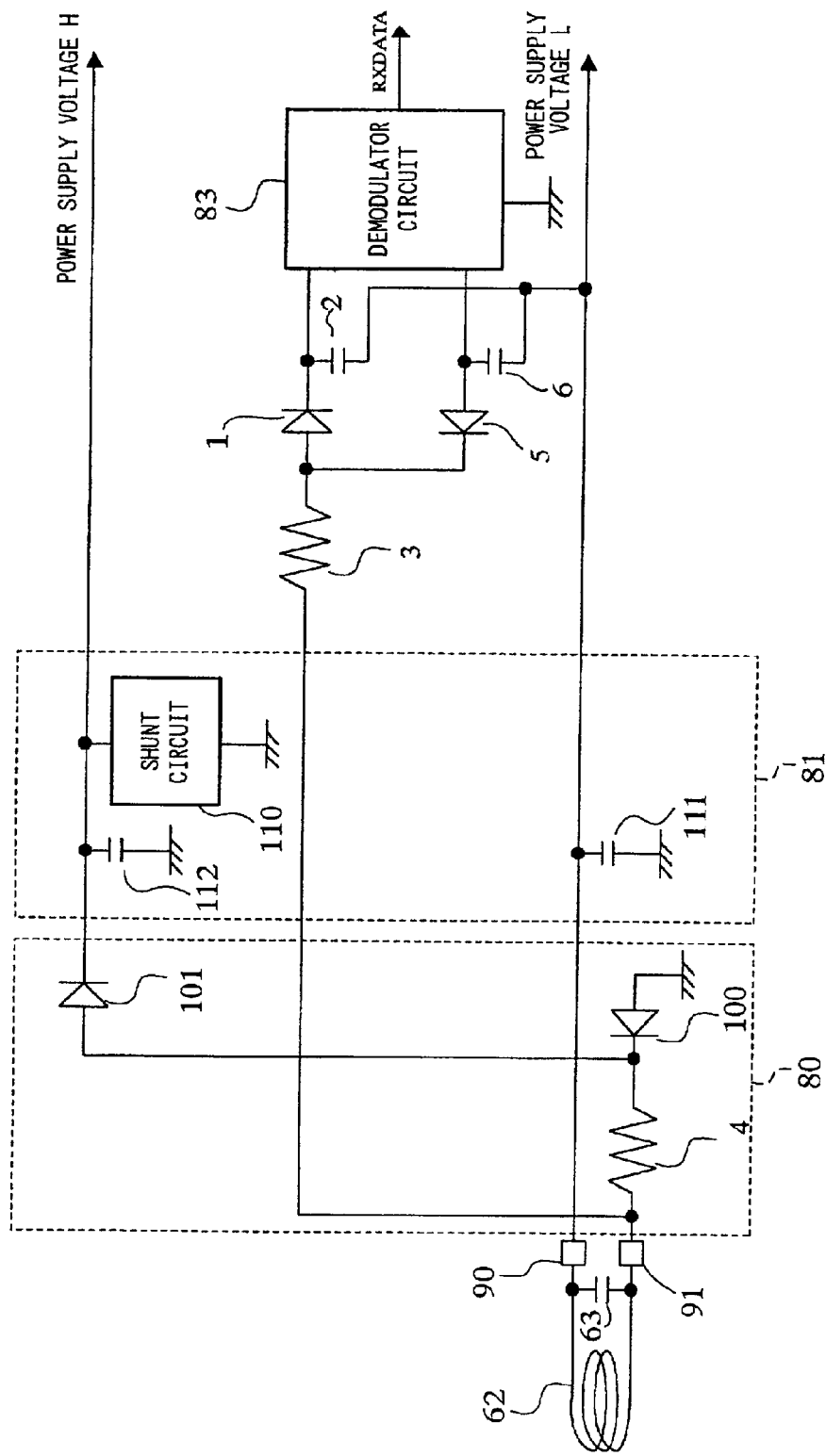
FIG. 6 is a structural diagram showing a voltage generating circuit and a demodulator circuit of (Embodiment 4) of the present invention.

FIG. 6 shows (Embodiment 4) of the present invention.

In FIG. 4 showing (Embodiment 3), voltage smoothing capacitors 2 and 6 on the input section of a demodulator circuit 83 have a reference potential of VSS. FIG. 6 showing (Embodiment 4) is different in that reference potentials of the voltage smoothing capacitors 2 and 6 are changed to power supply voltage L.

As shown in FIG. 5(B), a positive component voltage 123 and a negative component voltage (VSS) 122 have asymmetric changes. Therefore, a change in voltage of the positive component voltage 123 and the negative component voltage (VSS) 122 is varied according to a change in communication distance, thereby changing receiving sensitivity.

As shown in FIG. 5(A), the operation in the LSI 61 is performed with power supply voltage L (121) as a reference.

Hence, in order to improve symmetry of a change in voltage on the input section (the positive component voltage 123 and the negative component voltage 122) of the demodulator circuit 83, a reference voltage is changed from VSS to power supply voltage L.

With the above solution, changes of the positive component voltage 123 and the negative component voltage 122 are made symmetric with respect to a change in communication distance, thereby achieving stable communication characteristics.

As described above, the semiconductor integrated circuit and the noncontact information medium having the same are connected via a path in which the input of the rectifier circuit and the input of the demodulator circuit are separated from the output of the rectifier circuit. Thus, it is possible to simultaneously satisfy the control of power supply voltage and secured demodulating sensitivity, thereby entirely operating the semiconductor integrated circuit in a stable manner without the necessity for a large circuit. With the above semiconductor integrated circuit, a proximity-type noncontact IC card (communication distance of 0 to 10 cm) can be realized.

What is claimed is:

1. A semiconductor integrated circuit, comprising:
   a demodulator circuit for demodulating an inputted received signal to reproduce data;
   a rectifier circuit for rectifying said received signal to produce power supply voltage; and
   a regulator connected to an output side of said rectifier circuit and for preventing said power supply voltage from exceeding a predetermined voltage value, wherein:
   an input of said rectifier circuit and an input of said demodulator circuit are connected via a path separated from an output of said rectifier circuit; and
   the input of said rectifier circuit and the input of said demodulator circuit are connected via a resistor.

2. The semiconductor integrated circuit according to claim 1, wherein said resistor comprises a wire made of polysilicon.

3. The semiconductor integrated circuit according to claim 1, further comprising an envelope detector circuit on an input side of said demodulator circuit.

4. The semiconductor integrated circuit according to claim 3, wherein said rectifier circuit comprises a plurality of voltage doubler rectifier circuits for outputting first and second direct current power in parallel with different voltages, and a reference potential of said envelope detector circuit is connected to a low-voltage output of said voltage doubler rectifier circuit.

* * * * *